(12) United States Patent
Bragg (10) Patent No.: US 7,554,800 B2
(45) Date of Patent: Jun. 30, 2009

(54) EXTERNAL MODULE ELECTRICAL AND MECHANICAL ATTACHMENT MECHANISM AND METHOD

(75) Inventor: Charles Bragg, Bothell, WA (US)

(73) Assignee: Vulcan Portals, Inc., Seattle, WA (US)

( * ) Notice: Subject to any disclaimer, the term of this patent is extended or adjusted under 35 U.S.C. 154(b) by 234 days.

(21) Appl. No.: 11/447,597

(22) Filed: Jun. 5, 2006

(65) Prior Publication Data

US 2007/0279856 A1    Dec. 6, 2007

(51) Int. Cl.
*G06F 1/16* (2006.01)
(52) U.S. Cl. .............................. 361/679.58; 361/679.02; 348/373
(58) Field of Classification Search ................. 361/679, 361/681, 683; 348/373, 376
See application file for complete search history.

(56) References Cited

U.S. PATENT DOCUMENTS

| | | | | |
|---|---|---|---|---|
| 5,144,290 | A * | 9/1992 | Honda et al. ................. | 361/681 |
| 5,748,339 | A * | 5/1998 | Suzuki et al. ................ | 358/473 |
| 5,768,163 | A * | 6/1998 | Smith, II .................... | 361/683 |
| 5,801,919 | A * | 9/1998 | Griencewic ................. | 361/683 |
| 5,808,672 | A * | 9/1998 | Wakabayashi et al. ...... | 361/737 |
| 6,081,422 | A * | 6/2000 | Ganthier et al. ............. | 361/686 |
| 6,118,653 | A * | 9/2000 | Kim .......................... | 361/683 |
| 6,175,491 | B1 * | 1/2001 | Park .......................... | 361/683 |
| 6,300,979 | B1 * | 10/2001 | Parkinson et al. ........... | 348/143 |
| 6,323,902 | B1 * | 11/2001 | Ishikawa .................... | 348/373 |
| 6,416,239 | B1 * | 7/2002 | Chou et al. .................. | 348/373 |
| 6,587,151 | B1 * | 7/2003 | Cipolla et al. ............... | 348/373 |
| 6,590,547 | B2 * | 7/2003 | Moriconi et al. ............ | 361/681 |
| 6,798,647 | B2 * | 9/2004 | Dickie ........................ | 361/683 |
| 6,933,981 | B1 * | 8/2005 | Kishida et al. .............. | 348/375 |
| 7,034,902 | B2 * | 4/2006 | Tajima ....................... | 361/681 |
| 7,256,987 | B2 * | 8/2007 | Weng ......................... | 361/683 |
| 2002/0024611 | A1 * | 2/2002 | Watanabe et al. ........... | 348/373 |
| 2002/0044216 | A1 * | 4/2002 | Cha .......................... | 348/376 |

* cited by examiner

Primary Examiner—Jayprakash N Gandhi
Assistant Examiner—Adrian S Wilson
(74) Attorney, Agent, or Firm—Dorsey & Whitney LLP (57) ABSTRACT

The present invention is directed to a electrical and mechanical attachment mechanism for coupling a peripheral module to a computing device. The attachment mechanism includes a set of pawls that engage with a receiving chamber thereby mechanically coupling the module to the device. The attachment mechanism also includes a set of electrical signal coupling pins. The receiving chamber includes a set of electrical signal coupling pads which interface with the electrical signal coupling pins and thereby establish electrical connectivity between the module and the device. The mechanism further includes a set of buttons for locking the pawls into a retracted position to allow the user to more easily align and couple the module to the device. The pawls are automatically released from their retracted position by a lock release pin being pressed inwardly as the module attached to the device. The locking portions on the pawl and the receiving chamber may be designed with different angles depending on a desired pullout force.

15 Claims, 10 Drawing Sheets

EXTERNAL MODULE ELECTRICAL AND MECHANICAL ATTACHMENT MECHANISM AND METHOD

TECHNICAL FIELD

This invention generally relates to an apparatus and method for mechanically and electrically coupling two devices, and more particularly, for coupling a peripheral module to a computing device.

BACKGROUND OF THE INVENTION

In recent years computers, computing devices and associated peripherals have been undergoing a continual process of improvement. For example, virtually all computers and computing devices have become smaller and lighter due to advances in electronic miniaturization. Due to this extensive miniaturization, among other things, it is now common for individuals and businesses to possess computing devices capable of performing a wide range of tasks requiring the collection and processing of data. Owners of such computing devices can capture this computing power by coupling many different modules to the device. This is especially true of multimedia applications used with such devices. Capturing and processing multimedia such as digital photographs, sound recordings and digital movies are well within the ability of a properly configured and equipped computing device. The types of data and information that might be gathered is limited only by the different functional modules that can be coupled to the computing device. Such modules might include, for example, external storage devices like hard drives or flash memory devices, radio frequency ('RF') or infrared wireless communication modules, Global Positioning System ('GPS') modules, television tuner modules, and the like.

Several options currently exist for coupling and decoupling modules to a computing device. Perhaps the most ubiquitous means of coupling external modules to a computing device is through Universal Serial Bus ('USB') ports. There are many other common interface methods, along with their associated connectors, such as IEEE 1394 ('Firewire'), Centronics parallel, RS-232 serial, and the like. There are innumerable peripheral modules that take advantage of these electrical interface standards and their respective connectors.

All of these interface methods, however, suffer from a serious shortcoming. These interface methods are primarily electrical in nature and provide virtually no ability to rigidly and securely mechanically couple a module to a device while simultaneously providing the required electrical connectivity. Larger USB modules, for example, are almost invariably connected to a device by a standard USB cable. Such a cable obviously does nothing to physically secure the module to the device. Even with smaller USB modules, such as flash memory modules that plug directly into the USB port, the mechanical coupling between the module and the device is only ancillary to the electrical coupling. This shortcoming is likewise true of all the abovementioned interface standards and their connectivity ports.

This inability to rigidly and securely mechanically and electrically couple an external module to a computing device is particularly acute when dealing with portable computing devices. Using a USB cable, for example, to couple a camera module to a handheld computing device is cumbersome. The cable may tangle and is difficult to manage what are, except for their electrical coupling, essentially two different devices. In such situations it would be ideal if the camera module and the handheld computing device could be mechanically coupled together in a fashion that creates what is essentially a single physical device.

Accordingly, there is a need in the art for an electrical and mechanical attachment mechanism that provides a robust coupling mechanism that rigidly and securely mechanically couples a peripheral module to a computing device. Moreover, there is a need for such a mechanism to simultaneously provide electrical connectivity between the module and the device. There is also a need that such a mechanism be configurable so as to release the module from device in the event the module places undue mechanical stress on the device by, for example, being snagged on some other object.

SUMMARY OF THE INVENTION

An electrical and mechanical attachment mechanism and method is used to couple a module to an electrical device having at least one pawl receiving chamber. The attachment mechanism includes a plurality of moveable pawls disposed on the module. The pawls are configured to be inserted in the pawl receiving chamber to engage a surface of the pawl receiving chamber, thereby mechanically securing the module and the electrical device to each other. The attachment mechanism further includes at least one signal coupling pin projecting from the module and having a predetermined spatial relationship to the plurality of pawls. Each signal coupling pin contacts a respective signal coupling pad disposed within the receiving chamber when the module is mechanically secured to the electrical device, thereby electrically coupling the module and the electrical device.

BRIEF DESCRIPTION OF THE DRAWINGS

FIG. 5b is an assembled isometric view of the locking mechanism of FIG. 5a.

DETAILED DESCRIPTION OF PREFERRED EMBODIMENTS

The present invention is generally directed to an apparatus for coupling computing devices to associated peripheral modules. Many of the specific details of the embodiments of the invention are set forth in the following description and in FIGS. 1 through 5b to provide a thorough understanding of such embodiments. One skilled in the art will understand, however, that the present invention may be practiced without several of the details described in the following description.

Figure 1A:
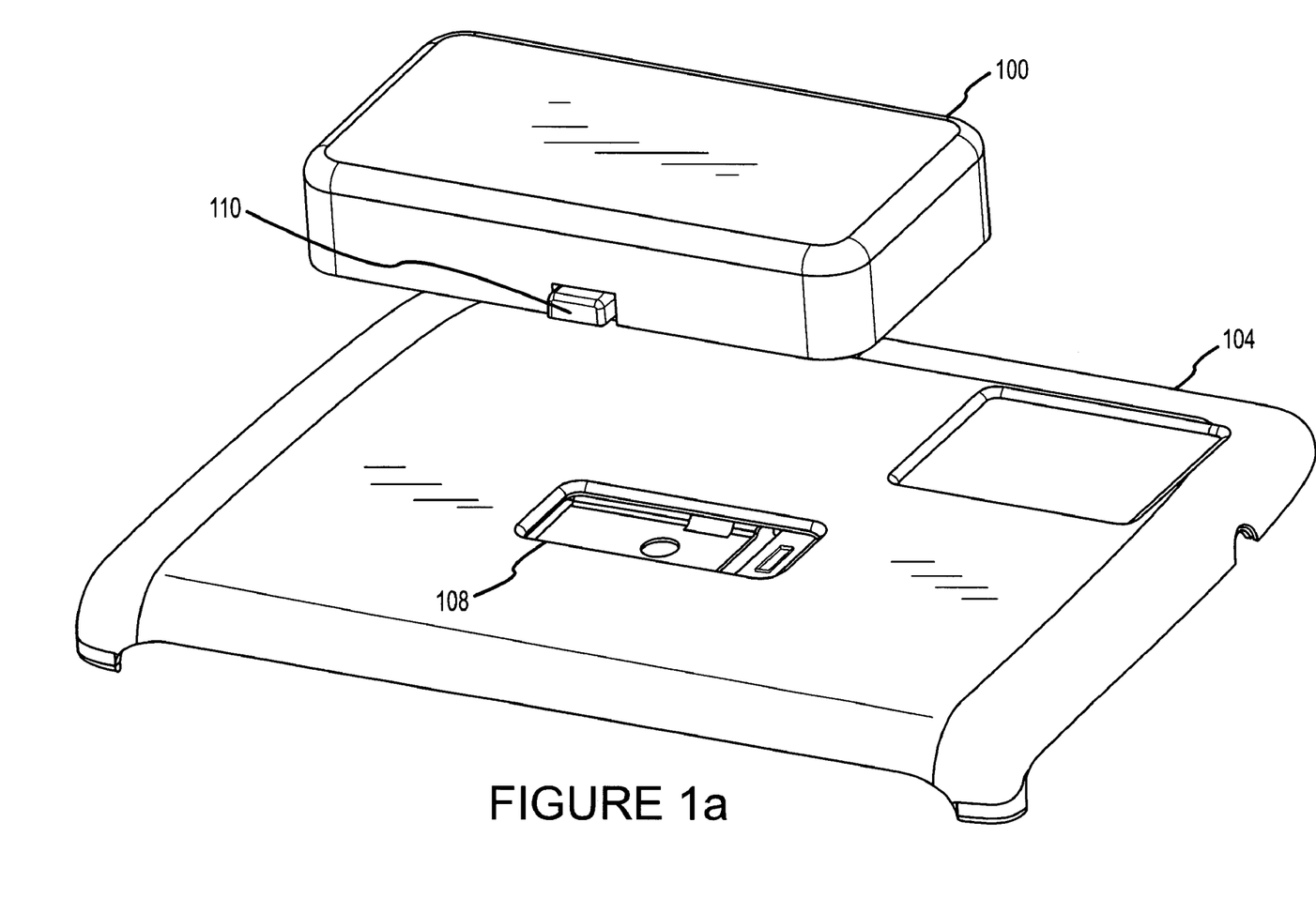
FIG. 1a is a top isometric view of a module and a partial cutaway view of a device according to an embodiment of the invention.

FIG. 1a is top isometric view of a module 100 that can be mounted on an electronic device 104 according to an embodiment of the invention. The electronic device 104 shown in FIG. 1a is a display cover for a laptop computer (not shown), but the electronic device may, of course, be other types of devices. The module 100 includes a lock button 110 shown on the front of the module 100 for releasing the module 100 from the device 104 after it has been locked in place. The module 100 shown in FIG. 1a is a video camera, but other types of modules 100, such as a global positioning system module, a cellular telephone module, a disk drive module, or other device may be used. Another such lock button 110 is not shown but is present on the exact opposite side of the module 100. The electronic device 104 contains a receiving chamber 108. As will be described in more detail below, the receiving chamber 108 is configured to receive pawls (not shown in FIG. 1) for securing the module 100 to the device 104. Electrical contact pins (not shown in FIG. 1) provide the ability to establish electrical connectivity between the device 104 and the module 100.

Figure 1B:
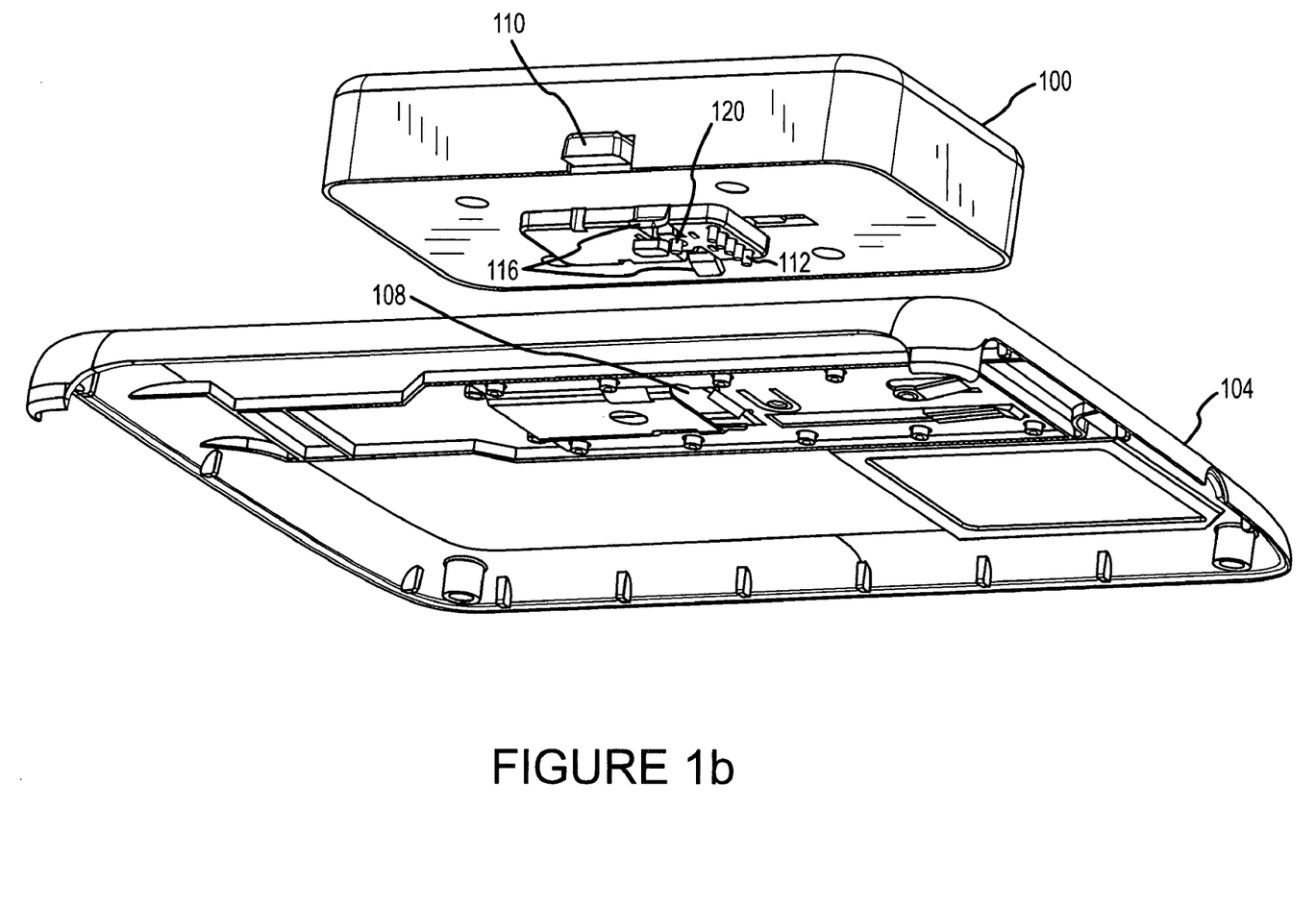
FIG. 1b is a bottom isometric view of the module and device shown in FIG. 1b.

FIG. 1b is a bottom isometric, partially cutaway view of the module 100 and the device 104 of FIG. 1a. It should be noted that the device 104 as shown is a cutaway view and is not a complete computing device. From this viewing angle, more details of the module 100 are evident. In addition to the lock button 110, FIG. 1b shows pawls 116 that are used to mechanically secure the module 100 to the device 104, electrical contact pins 112 that are used to electrically connect the module 100 to the device 104, and a lock release pin 120 that releases the pawls 116 when they are in the retracted position. The pawls 116, contact pins 112 and lock release pin 120 are described in greater detail below. The electrical contact pins 112 may be of any number sufficient to implement whatever electrical connectivity is required for the given application. Typically, there will be four to six pins 112 configured to permit communication between the device 104 and module 100 using one of the above mentioned electrical communication standards such as USB.

Figure 2:
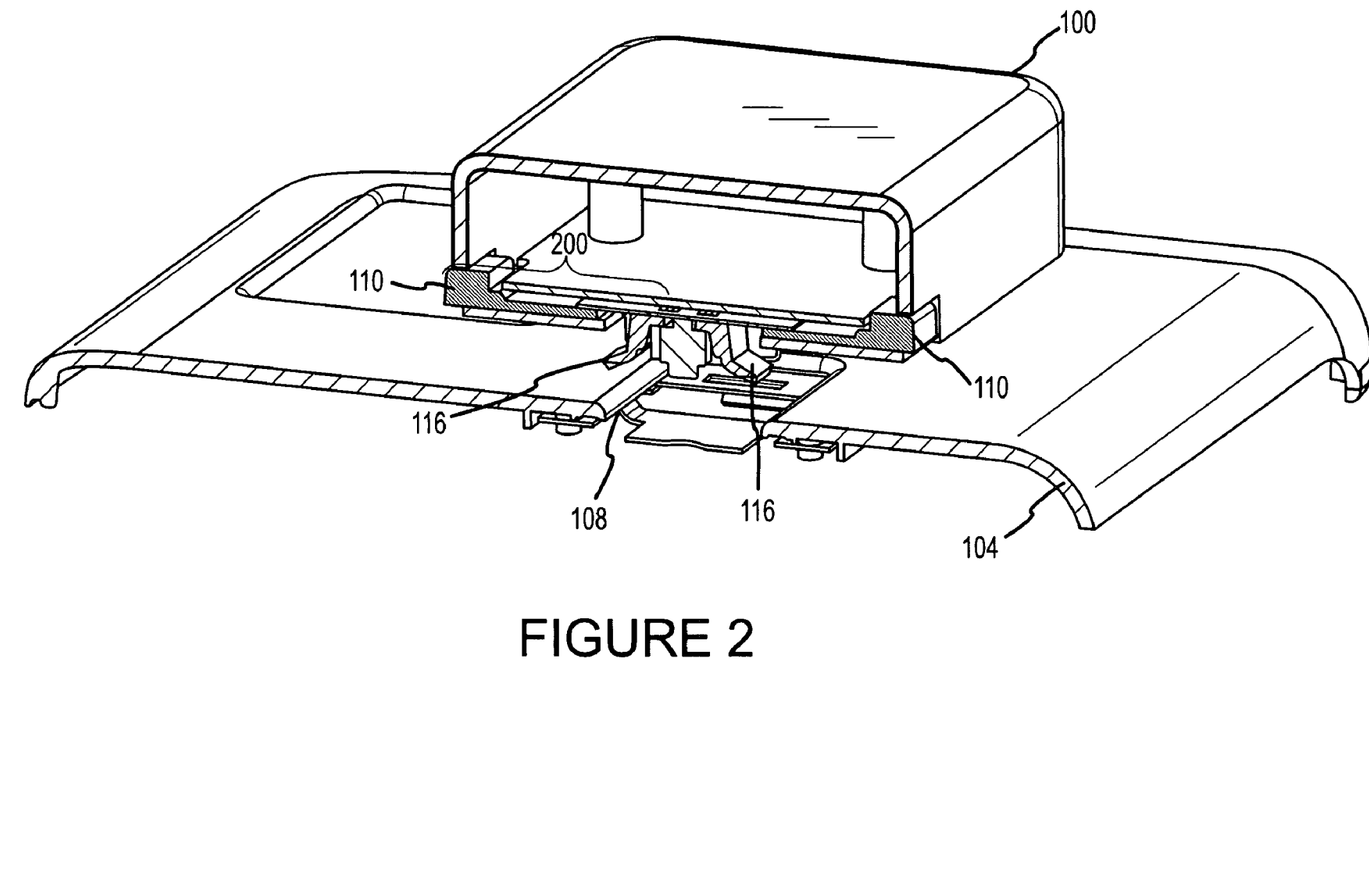
FIG. 2 is a close-up, isometric, partially cutaway view of a module and a device.

FIG. 2 shows engagement assemblies 200 that mechanically interconnect portions of the module 100 and the device 104. Each of the engagement assemblies 200 include the lock button 110 mechanically coupled to the pawl 116. Although each of the engagement assemblies 200 have the lock button 110 and pawl 116 integrally formed with each other, they may be fabricated as separate components interconnected or secured to each other. Each of the assemblies 200 might, for example, be cast from aluminum, machined from aluminum or other material or plastic injection molded, or the like.

Figure 3A:
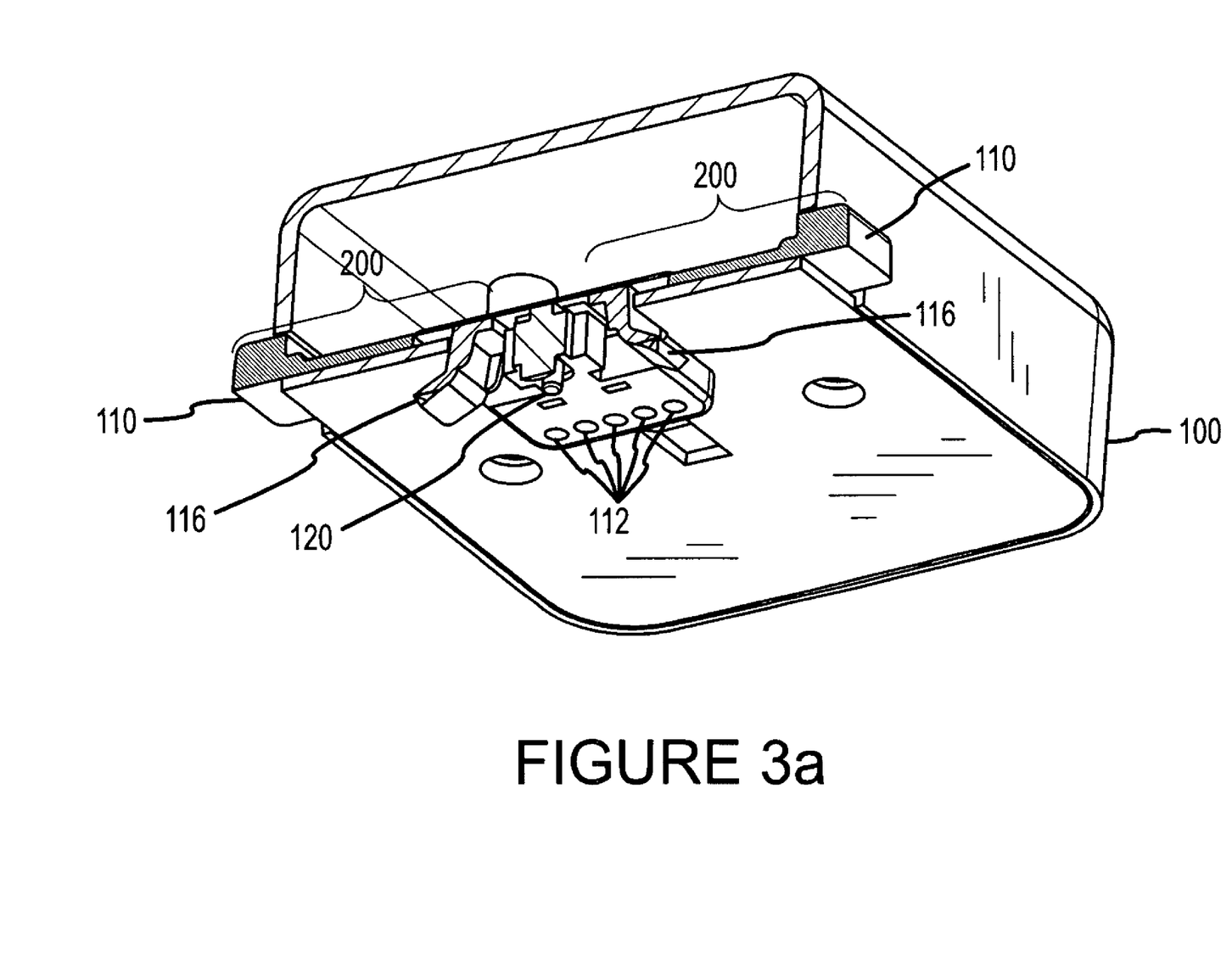
FIG. 3a is a bottom isometric, partially cutaway view of a module showing attachment pawls in their rest position.
Figure 5A:
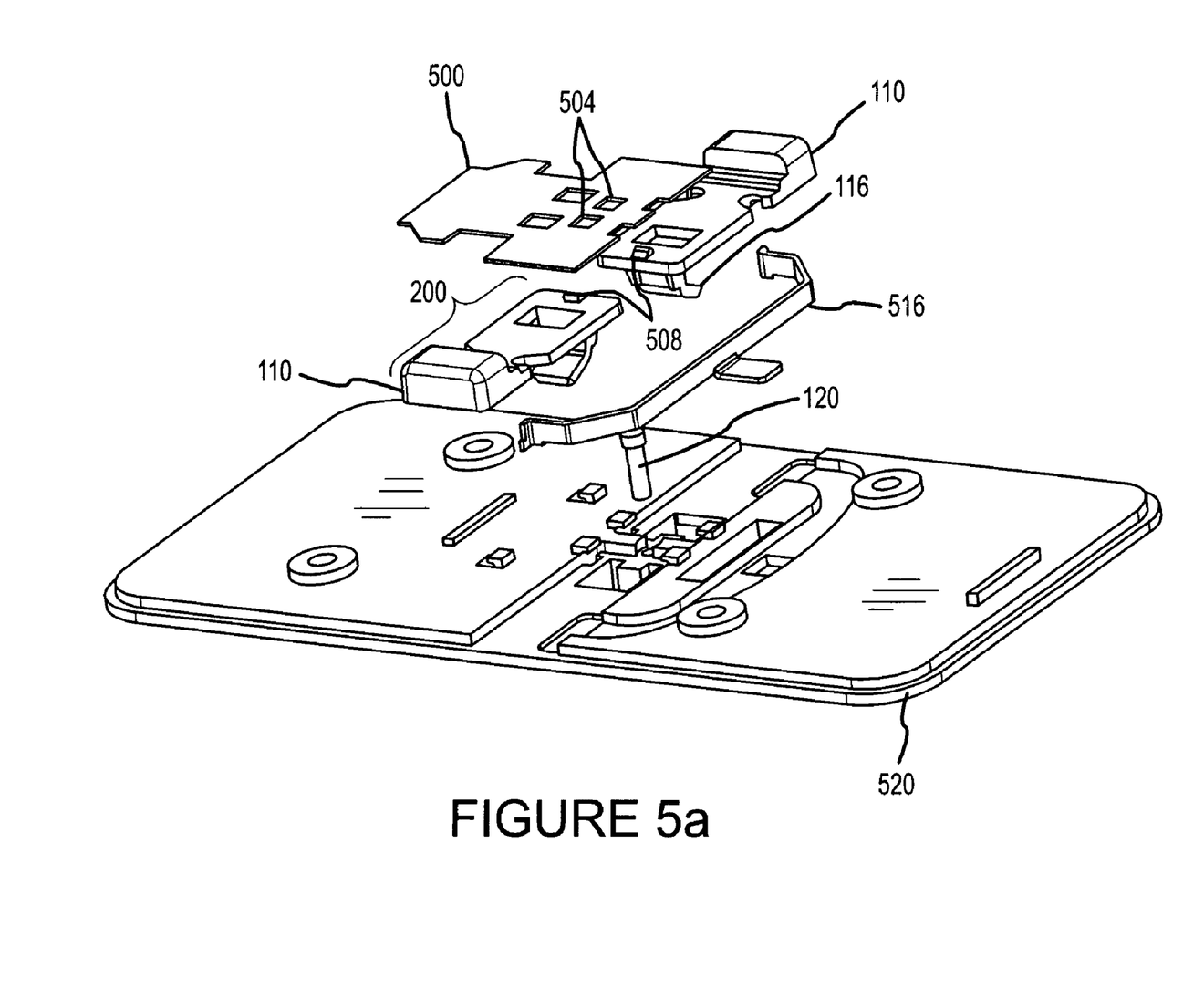
FIG. 5a is an exploded isometric view of the locking mechanism according to an embodiment of the invention.
Figure 5B:
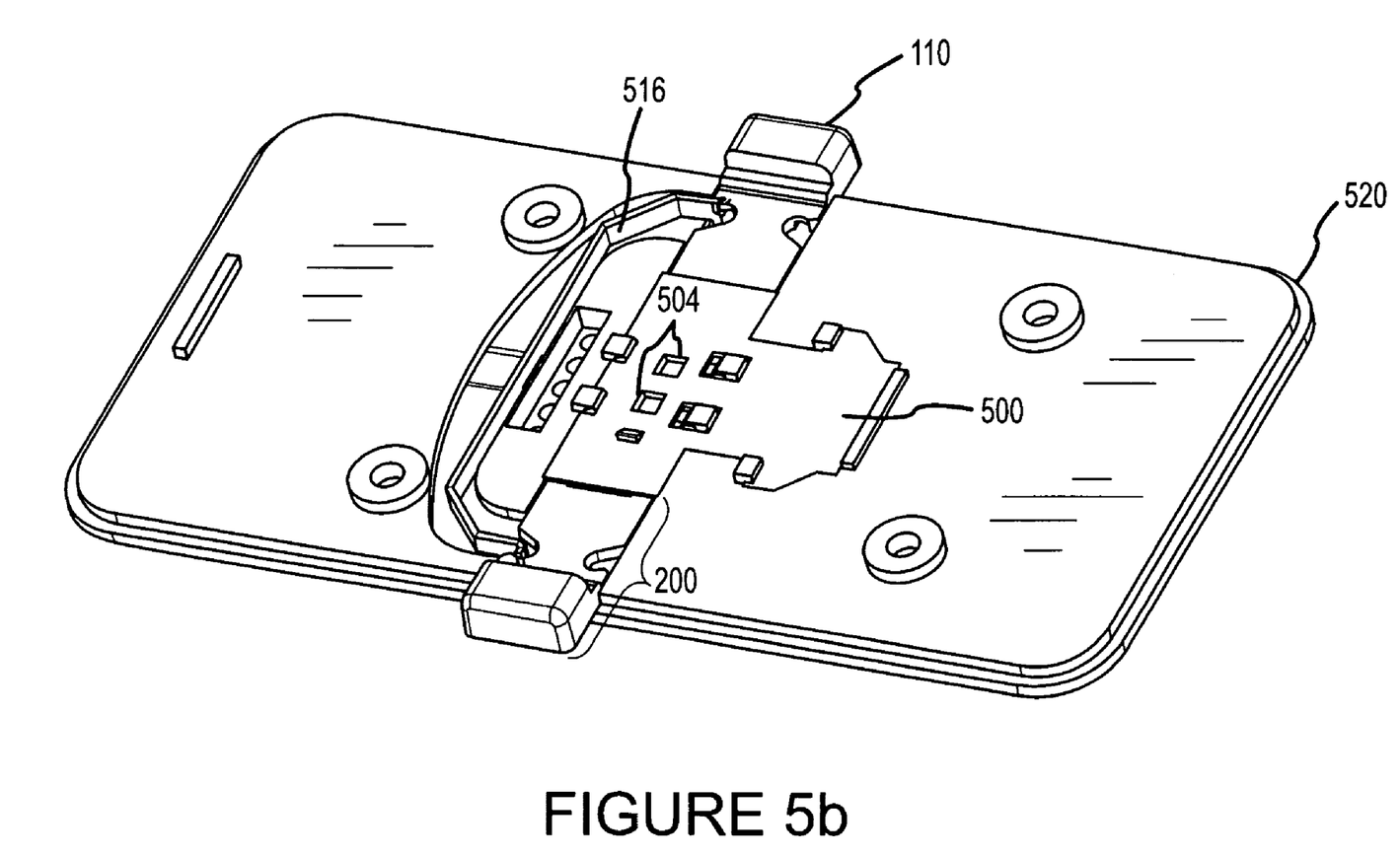

FIG. 3a shows the engagement assemblies 200 in their rest position. The engagement assemblies 200 are in their rest position whenever the module 100 is coupled to the device 104. The engagement assemblies 200 are resiliently biased to this rest position by a spring assembly, which will be shown and described in connection with FIG. 5.

Figure 3B:
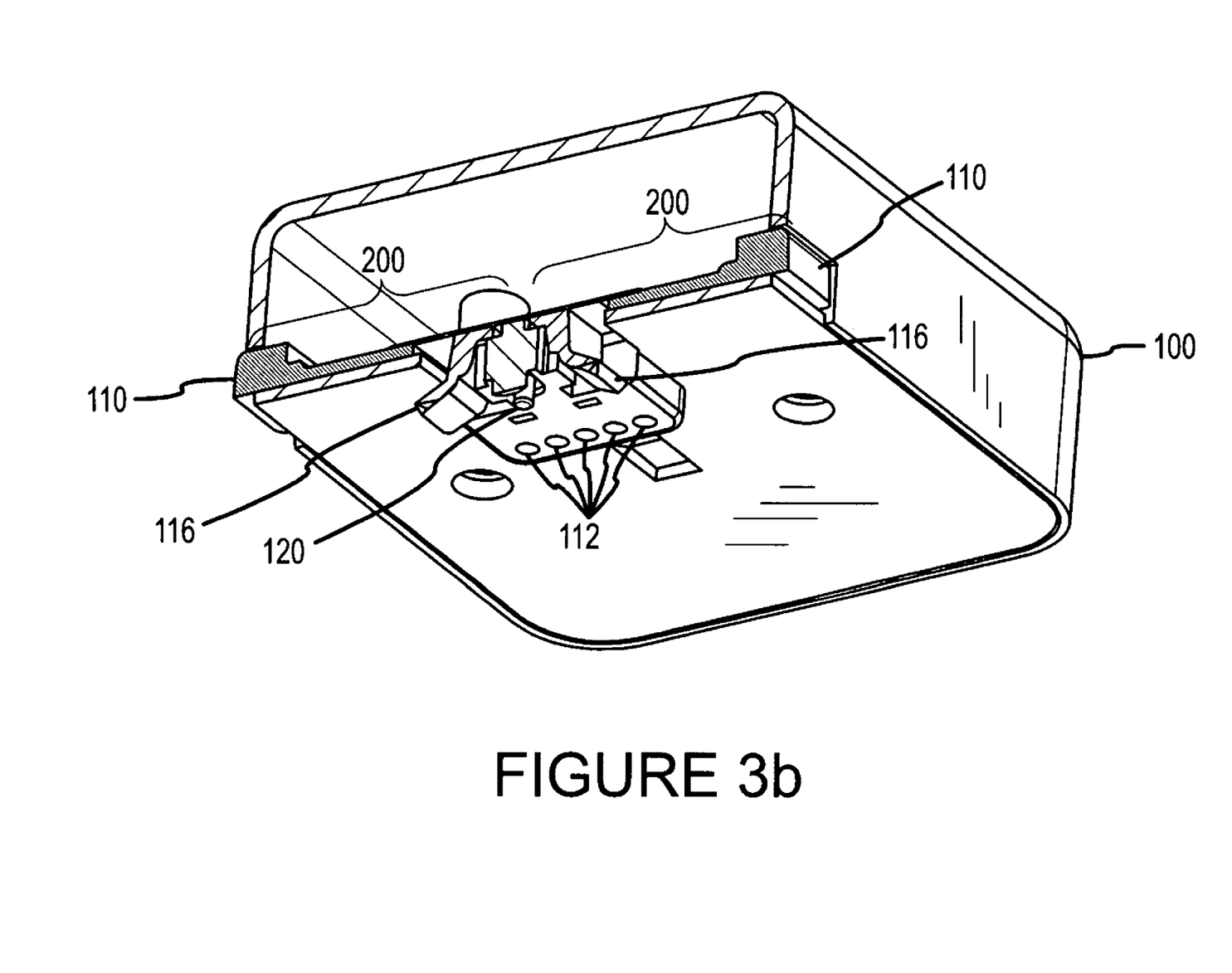
FIG. 3b is a bottom isometric, partially cutaway view of a module showing attachment pawls in their locked position.
Figure 4A:
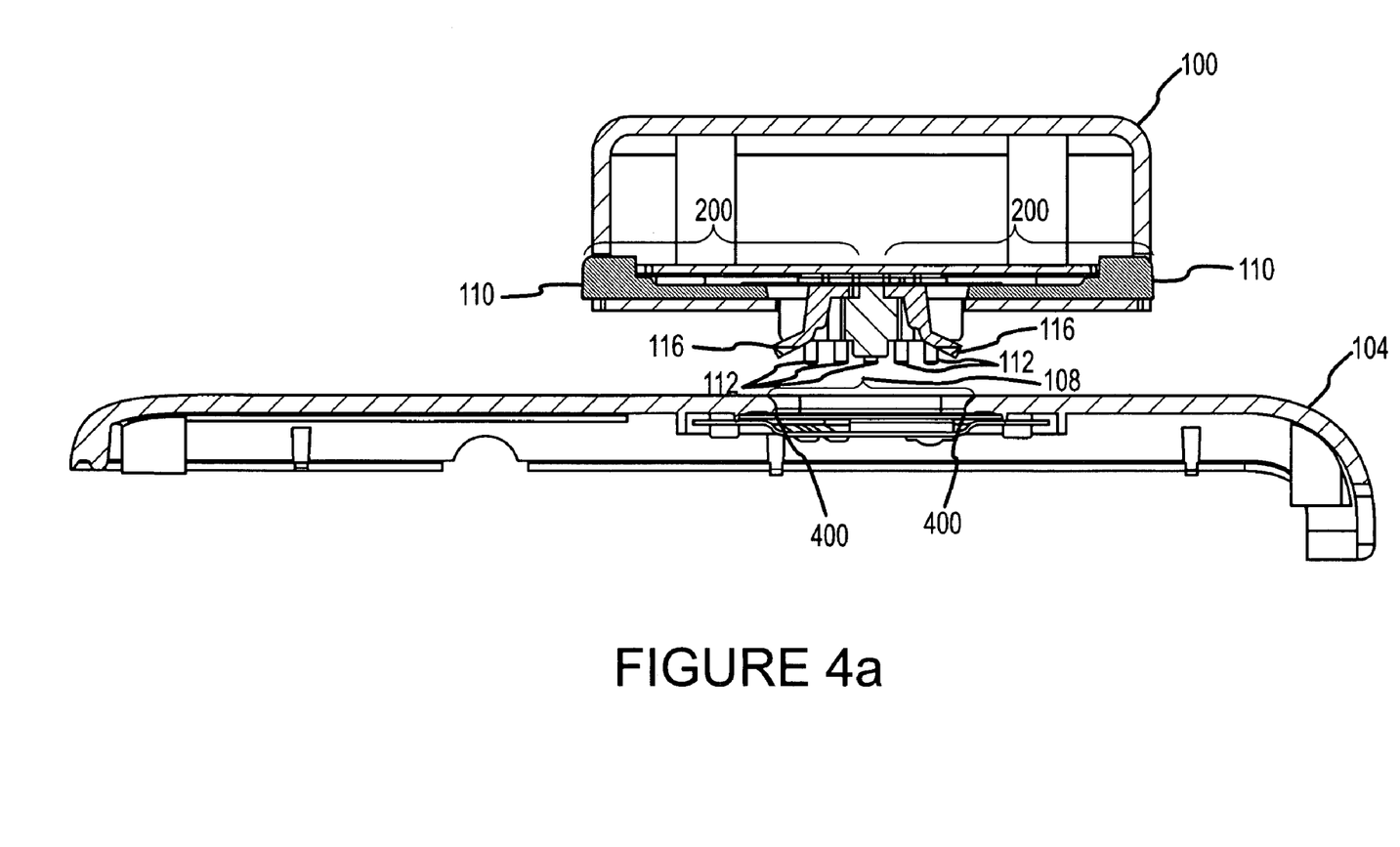
FIG. 4a is a cross-sectional view of the module and device prior to coupling the module and device, and with the locking mechanism of the module shown in the locked position.
Figure 4B:
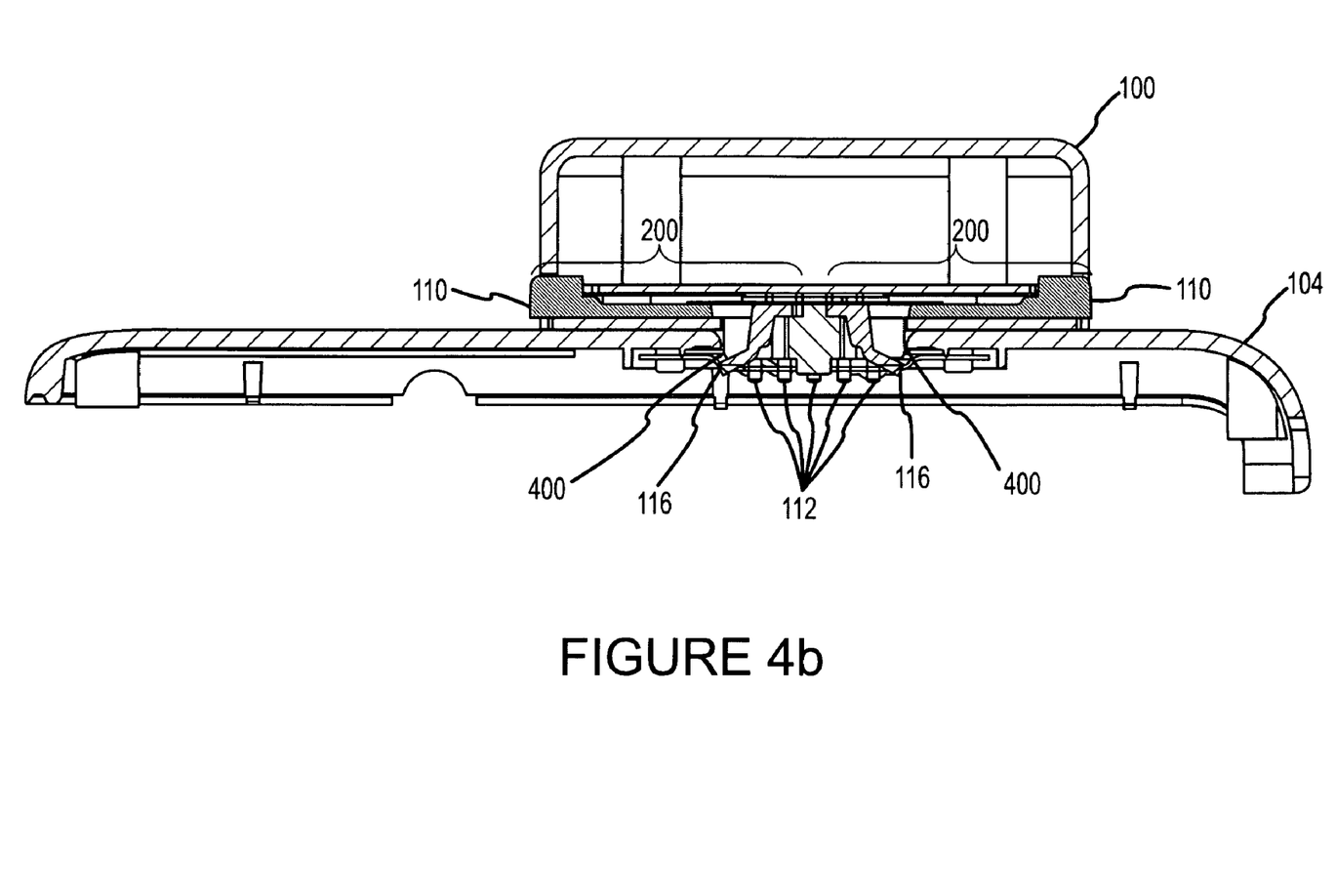
FIG. 4b is a cross-sectional view of the module and device after inserting the module into device, but prior to the locking mechanism unlocking and mechanically coupling the module to the device.
Figure 4C:
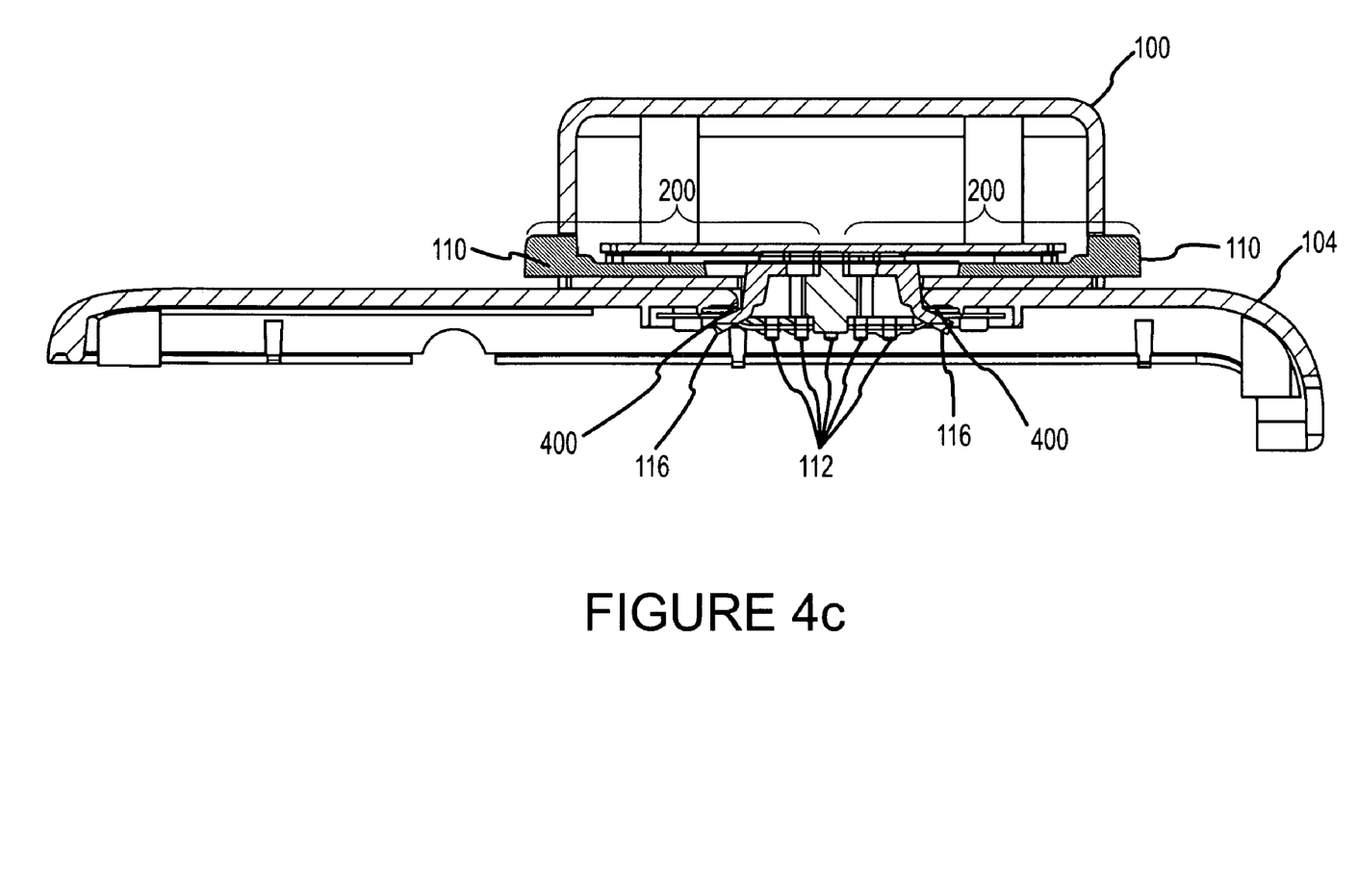
FIG. 4c is a cross-sectional view of the module and device after inserting the module and after the locking mechanism has unlocked and coupled the module to the device.

To couple the module 100 to the device 104, the user will typically hold the module with the buttons 110 grasped between the thumb and middle finger. After grasping the module thus, the user may press the buttons 110 to move the engagement assemblies 200 inwardly until they reach a predetermined retracted position, as shown in FIG. 3b, if not already in this position. Once the assemblies 200 reach this retracted position, they are locked by a locking mechanism described below so that the user no longer needs to exert an inward force on the buttons 110 to keep the assemblies 200 in this retracted position. With the engagement assemblies 200 in their retracted position, the user aligns the module 100 with the device 104 so that the pawls 116 and lock release pin 120 may enter the receiving chamber 108. The lock release pin 120 is biased outwardly by a spring (not shown). The lock release pin 120 is free, however, to move inwardly if pressed upon. As the lock release pin 120 is being inserted into the receiving chamber 108, it engages with a portion of the device 104 so as to push the lock release pin 120 into the module 100. To prevent the module 100 from being secured to the device 104 backwards (i.e., with the module 100 rotated 180 degrees), there is no structure within the receiving chamber 108 to engage the lock release pin 120 if the module 100 is inserted in the backward position. Once the lock release pin 120 has reached a predetermined position within the module 100, the engagement assemblies 200 are released, and a spring (not shown) biasing the engagement assemblies 200 outwardly moves them back into the rest position shown in FIG. 3a. Once the pawls 116 reach the rest position, the angled face of the pawls 116 engage on an edge of the receiving chamber 108 thereby securing the module 100 to the device 104, as also shown in FIG. 3a. FIGS. 4a through 4c illustrate the coupling procedure outlined above in greater detail. FIG. 4a shows the module 100 with the engagement assemblies 200 in the retracted position immediately prior to coupling the module 100 to the device 104. FIG. 4b shows the module 100 after the pawls 116, electrical contacts 112 and lock release pin 120 have been inserted into the receiving chamber 108 but prior to the lock release pin 120 actuating so as to release the pawls 116. FIG. 4c illustrates the module 100 after it has been electrically and mechanically coupled to the device 104. As discussed more thoroughly above, the lock release pin 120 has released the engagement assemblies 200, which have now returned to their rest position. FIG. 4c also illustrates how the pawls 116 engage with the device 104 via receiving chamber edges 400 of the receiving chamber 108. For illustration purposes only, FIGS. 4a-4c omit the electrical connections associated with the device 104. It will be appreciated, however, that once the module 100 is coupled to the device 104 in the manner shown in FIG. 4c, the electrical contact pins 112 are abutting electrical contact pads (not shown) thereby establishing the required electrical connectivity between the device 104 and the module 100.

FIGS. 5a and 5b illustrate various components that interface with the engagement assemblies 200. In particular, FIG. 5a shows an exploded view of the engagement assemblies 200 and associated components and FIG. 5b illustrates the engagement assemblies 200 and associated components in their assembled positions. The engagement assemblies 200 are mounted on a module base 520 which is configured to also receive the lock release pin 120, and a spring 516. As has been described above, the mechanical engagement assemblies 200 are manually moved inwardly until they are locked into their retracted position. This position is determined by the location of lock tab receivers 504 formed on a lock plate 500. As the engagement assemblies 200 are moved inwardly lock tabs 508, portions of the assemblies 200, are likewise moved inwardly until such time as they align with the lock tab receivers 504. When this occurs, the lock tabs 508 engage with the edge of the lock tab receivers 504 to lock the engagement assemblies 200 in place and prevent the spring 516 from moving the assemblies 200 back to the rest position. As also explained above, the engagement assemblies 200 are unlocked and return to their rest position when the lock pin 120 is pressed inwardly as the module 100 is coupled to the device 104. Specifically, when the lock pin 120 is pressed inwardly, it engages the lock plate 500 and deflects it upwardly. Once the lock plate 500 has been deflected upwardly a sufficient distance, the edges of the lock tab receivers 504 are disengaged from the lock tabs 508, which have remained stationary. Once the lock tabs 508 are disengaged from the lock tab receivers 504, the spring 516 forces the engagement assemblies 200, along with the pawls 116, back to the rest position.

Although the invention has been described with reference to the disclosed a embodiments, persons skilled in the art will recognize that changes may be made in form and detail without departing from the spirit and scope of the invention. Such modifications are well within the skill of those ordinarily skilled in the art. Accordingly, the invention is not limited except as by the appended claims.

What is claimed is:

1. An electrical and mechanical attachment mechanism for coupling a module to an electrical device comprising:
    at least one pawl receiving chamber within the electrical device;
    a plurality of moveable pawls disposed on the module and configured to be inserted in the at least one pawl receiving chamber to engage a surface of the at least one pawl receiving chamber, the plurality of moveable pawls having a resilient bias along a first axis in a first direction;
    at least one button coupled to the plurality of pawls and configured to displace the plurality of moveable pawls to a retracted position;
    a lock release pin projecting from the module and resiliently biased along a second axis, the lock release pin being configured to release the pawls from the retracted position in response to the lock release pin being pushed into the module along the second axis to a particular distance and thereby allowing the resilient bias along the first axis to move the pawls in the first direction;
    at least one signal coupling pin projecting from the module and having a predetermined spatial relationship to the plurality of pawls; and
    at least one signal coupling pad disposed within the receiving chamber and configured to interface with the at least one signal coupling pin and thereby electrically couple signals between the module and the electrical device.

2. The mechanism of claim 1, wherein the at least one button is configured to displace the pawls along the first axis in a second direction that is opposite the first direction in response to a force being applied to the at least one button.

3. The mechanism of claim 2 further comprising a locking mechanism that locks the position of the at least one pawls once the pawls have been moved to the retracted position.

4. The mechanism of claim 1 wherein the surfaces of the pawls that engage the at least one pawl receiving chamber are angled to allow the pawls to be removed from the at least one pawl receiving chamber with a pullout force corresponding to the slope of the angle.

5. The mechanism of claim 1 wherein the electrical device comprises a computer.

6. The mechanism of claim 5 wherein the electrical device comprises a display cover for a computer.

7. The mechanism of claim 1 wherein the at least one pawl receiving chamber is positioned on the display cover of the computer at a location that is spaced from edges of the display cover.

8. The mechanism of claim 1 wherein the module comprises a video camera module.

9. A module configured to electrically and mechanically couple to an electrical device, the module comprising:
    a plurality of moveable pawls having a resilient bias in a first direction;
    at least one button configured to displace the pawls along in a second direction that is the opposite the first direction in response to a force being applied to the at least one button;
    at least one electrical contact pin projecting from the module, the at least one contact pin being resiliently biased away from the module and being displaceable into the module; and
    a lock release pin projecting from the module, the lock release pin being resiliently biased away from the module and being displaceable into the module, the lock release pin being configured to release the pawls and allow the resilient bias to move the pawls in the first direction when the lock release pin has been displaced into the module a predetermined distance.

10. The module of claim 9 wherein the pawls have engagement surfaces are angled to provide the pawls with a pullout force corresponding to the slope of the angle.

11. The module of claim 9 wherein the module comprises a video camera module.

12. A method for coupling a module having a plurality of pawls to an electrical device having at least one receiving chamber, the pawls being resilient bias to a first position, the method comprising:
    locking the pawls in a retracted position that is different from the first position;
    aligning the pawls with the receiving chamber;
    moving the module relative to the electrical device such that the pawls move into the receiving chamber; and
    automatically releasing the pawls and moving the pawls to an engagement position in which the pawls engage surfaces of the at least one receiving chamber once the pawls have been moved into the receiving chamber.

13. The method of claim 12 wherein the act of automatically releasing the pawls comprise pressing a lock release pin projecting from the module onto a surface of the device with sufficient force so that the lock pins is pressed into the module to release the pawls.

14. The method of claim 12, further comprising electrically coupling the module to the electrical device.

15. The method of claim 14 wherein the act of electrically coupling the module to the electrical device comprises pressing at least one conductive pin extending from a surface of the module against a respective conductive pad within the receiving chamber.

* * * * *